United States Patent [19]

Longworth

[11] 4,283,361

[45] Aug. 11, 1981

[54] PREPARATION OF SHAPED ARTICLES OF POLY(METAPHENYLENE ISOPHTHALAMIDE)

[75] Inventor: Ruskin Longworth, Greenville, Del.

[73] Assignee: E. I. Du Pont de Nemours and Company, Wilmington, Del.

[21] Appl. No.: 108,794

[22] Filed: Dec. 31, 1979

[51] Int. Cl.³ .................... B29G 1/00; C08G 69/46
[52] U.S. Cl. .................... 264/120; 260/37 N; 264/126; 264/320; 264/331.19; 528/348
[58] Field of Search ............... 264/331, 126, 125, 319, 264/120, 320; 528/348; 525/178; 260/37 N

[56] References Cited

U.S. PATENT DOCUMENTS

| | | | |
|---|---|---|---|
| 3,287,324 | 11/1966 | Sweeny | 528/348 |
| 3,413,394 | 11/1968 | Jordan | 264/126 |
| 3,925,323 | 12/1975 | Turnbull | 528/348 |
| 3,965,236 | 6/1976 | Turnbull | 264/126 |
| 4,016,140 | 4/1977 | Morello | 264/331 |
| 4,036,907 | 7/1977 | Turnbull | 528/348 |

Primary Examiner—Jeffery R. Thurlow

[57] ABSTRACT

Process for the preparation of shaped articles of poly(metaphenylene isophthalamide) by simultaneously heating poly(metaphenylene isophthalamide) and applying moderately elevated pressures.

7 Claims, No Drawings

PREPARATION OF SHAPED ARTICLES OF POLY(METAPHENYLENE ISOPHTHALAMIDE)

BACKGROUND OF THE INVENTION

Poly(metaphenylene isophthalamides) are useful in a wide variety of commercial applications. The outstanding performance characteristics of these polymers under stress and at high temperatures have made them useful in the form of bushings, seals, electrical insulators, compressor vanes and impellers, pistons and piston rings, gears, thread guides, cams, brake linings, and clutch faces. These polymers are often prepared in the form of coalescible powders. The powders can be formed into the desired final shape by molding techniques or can be formed into stock shapes, such as rods, tubes and sheets which can be machined into the desired final form.

The unusual thermal characteristics of poly(metaphenylene isophthalamides) have required special molding techniques. Although these compositions are linear polyamides, their melt viscosity is so high that they cannot be considered to be thermoplastic as the term is normally understood. In the past, as noted in Jordan, U.S. Pat. No. 3,413,394, shaped articles were made by coalescing powders of these and similar materials using elevated pressures of from 3,000 to 30,000 psi while simultaneously heating in excess of 300° C. However, these high temperatures and pressures had to be maintained for a considerable period of time, severely limiting production capability. Accordingly, as described in the Jordan patent and Turnbull, U.S. Pat. No. 3,925,323, coalescing techniques were developed which first pressed the coalescible powder into the desired final configuration under high pressures of from 10,000 to 100,000 psi and then separately heating the resulting preform to a temperaure of 250° C. or higher. While this two-stage coalescing technique provided desirable products, it still required the use of special apparatus to exert the high pressures required in the first stage of the operation, and often failed to provide satisfactory shaped articles having a maximum dimension greater than about 3 inches.

SUMMARY OF THE INVENTION

The instant invention provides an improved process for the production of shaped articles of poly(metaphenylene isophthalamide) in a wide variety of sizes which does not require the use of exceptionally high pressure molding apparatus.

Specifically, the instant invention provides a process for the preparation of shaped articles from coalescible and densifiable powder of poly(metaphenylene isophthalamide) by heating the powder in a mold of the desired configuration to a temperature of about from 265° to 320° C. while simultaneously maintaining the powder under a pressure of about from 100 to 2500 psi.

DETAILED DESCRIPTION OF THE INVENTION

The present invention is applicable to coalescible and densifiable powders of poly(metaphenylene isophthalamide) having a density of about from 0.4 to 1.3 g/cc when pressed into a preform and a density when sintered of at least about 1.24 g/cc. Such coalescible powders can be prepared from a solution of the polymer in a solvent such as dimethylacetamide (DMAC), the solution being combined with a precipitant such as water to provide a slurry of polymer. The slurry is then filtered, washed, and dried to provide a filter cake which is ground and screened to the desired particle size. Such a process is described in detail in Turnbull, U.S. Pat. No. 3,925,323, hereby incorporated by reference. Other methods of removing the solvent can be used, such as spray drying.

If desired, the coalescible powder can include up to about 75 percent by weight of modifying fillers, and can also contain minor percentages of other polymeric components. For example, the poly(metaphenylene isophthalamide) can be a copolymer prepared from a mixture of metaphenylene diamine and up to about 15 percent by weight of paraphenylene diamine. Such fillers can be admixed with the coalescible powder or incorporated by addition to a solution of the polymer prior to precipitation and polymer particle formation as described in the copending application of Manwiller, U.S. Ser. No. 25,565, filed Mar. 30, 1979 now U.S. Pat. No. 4,243,574 issued Jan. 6, 1981.

The poly(metaphenylene isophthalamide) powders can be used in the instant process without unusual drying techniques. For example, powders stored at ambient conditions of 70° F. and 70% relative humidity, which have equilibrated to about 7 percent by weight moisture, are entirely satisfactory.

In accordance with the instant process, the coalescible and densifiable powder is simultaneously treated at elevated temperatures and moderately elevated pressures. The temperature used in the present process is about from 265° to 320° C., and preferably about from 285° to 295° C. The pressures used are about from 100 to 2500 psi, and preferably about from 200 to 1500 psi.

The specified temperature and pressure are applied to the coalescible and densifiable powder in a mold of the desired configuration. Any apparatus consistent with the pressure required and the desired molded configuration can be used. Alternatively, for ease of handling, the powder can be preformed into about the desired configuration by compacting at elevated pressures, for example, about from 1000 to 2500 psi.

The coalescible and densifiable powder is maintained at the desired pressure and subjected to the elevated temperatures for a period of time sufficient to heat the powder to the specified temperature range. In general, for molded articles having a maximum dimension of 10 inches, a period of about from 10 to 30 minutes is sufficient.

The molded articles resulting from the present invention exhibit outstanding uniformity of strength and density, retention of as-moded dimensions and dimensional uniformity. In addition, the process permits the preparation of shapes having greater complexity than has heretofore been possible for shaped articles of poly(metaphenylene isophthalamide). Moreover, the process can be used to prepare molded articles with finer detail than have previously been possible, including those having small grooves and cavities.

The present invention is further illustrated by the following specific Examples.

EXAMPLE 1 AND COMPARATIVE EXAMPLE A

In Example 1, a two-inch cylindrical plug mold was fitted with a matched pair of plugs so that a 1" diameter, hollow, hemispherical cup of $\frac{1}{8}$" thickness could be molded in the center. Samples of poly(metaphenylene isophthalamide) were prepared according to the procedures of Turnbull, U.S. Pat. No. 3,925,323, Example 1. The powder consisted of loose aggregates having an average size of 200 microns. The samples of powder were placed in the mold and a force of about 2500 psi applied with the temperature held at 290°–295° C. for 10 minutes. On cooling and extraction, the spherical surfaces were perfectly formed. The surrounding flange could be varied in thickness by varying the charge of powder from about 0.1″ up to at least ¾″ without any loss of definition.

In Example A, a similar shape was prepared by first molding a preform of dry poly(metaphenylene isophthalamide) powder at a force of 63,000 lbs, and subsequently sintering without pressure at a temperature of 250° C. for 15 hours; 250° to 300° C. for ½ hour; and 300° C. for 1 hour.

The shaped articles of Examples 1 and A were compared for dimensional uniformity, density and appearance. The density of the molded product was measured by water displacement on samples taken from three corresponding locations in the molded article. The density of Example 1 varied from 1.33 to 1.35 g/cc, while the range of variation in the density of the molded product of Comparative Example A was twice as great, ranging from 1.29 to 1.35 g/cc. Moreover, the molded product of Example A was badly cracked, particularly in the region of highest density, and exhibited a color variation indicative of insufficient density or overcompaction at various points of the molded article.

EXAMPLES 2-4

In Examples 2-4, three-inch diameter discs, about 0.075 inch thick, were molded by putting aliquots of poly(metaphenylene isophthalamide) powder, prepared as in Example 1, into a mold and heating under pressure to 290° C., maintaining that temperature for 15 minutes to insure uniform heating, and then cooling to 200° C. before extraction. Molding pressures for Examples 2, 3 and 4 were varied from 150 lbs/square inch to 1450 lbs/square inch. Tensile strength test bars were cut from the discs and the tensile strength and molded density were measured as in the aforementioned U.S. Pat. No. 3,925,323. All parts were found to be coherent and exhibited good strength. The results of the testing are summarized in the following Table:

TABLE I

| Example | Molding Pressure (psig) | Tensile Strength (psi) | Density (g/cc) |
|---|---|---|---|
| 2 | 150 | 14,800 | 1.33 |
| 3 | 200 | 16,600 | 1.33 |
| 4 | 1450 | 16,190 | 1.34 |

EXAMPLES 5-14

Aliquots of poly(metaphenylene isophthalamide) powder were put into a cylindrical mold having an inner diameter of 1.279 inch and pressed into preforms at pressures of 2500 psi, 1950 psi, and 1460 psi. The preforms were machined to various smaller diameters, put back into the mold, heated to 295±5° C. and molded at 2500 psi for 10 minutes. The mold was cooled to below 200° C. and the molded plug extracted. The diameter of the molded plug was measured four times to provide an average. The preform molding pressures, the preform machined diameters, the preform densities, the molded densities and the molded diameters are summarized in Table II. The preform densities are determined by direct measurement. Irrespective of the dimensions of the preform, the molded diameters are all about 1,272 inch, with a standard deviation of 0.00025 inch.

TABLE II

| Example | Preform Molding Pressure (psi) | Preform Machined Diameter (inches) | Preform Density | Molded Density g/cc | Molded* Diameter |
|---|---|---|---|---|---|
| 5 | 2500 | 1.144 | .520 | 1.330 | 1.2715 |
| 6 | 2500 | 1.204 | .536 | 1.331 | 1.272 |
| 7 | 2500 | 1.139 | .539 | 1.324 | 1.2718 |
| 8 | 2500 | 1.205 | .534 | 1.329 | 1.2718 |
| 9 | 2500 | 1.200 | .534 | 1.327 | 1.2719 |
| 10 | 2500 | 1.146 | .544 | 1.332 | 1.272 |
| 11 | 1950 | 1.138 | .514 | 1.330 | 1.272 |
| 12 | 1950 | 1.205 | .522 | 1.344 | 1.272 |
| 13 | 1460 | 1.205 | .484 | 1.331 | 1.272 |
| 14 | 1460 | 1.137 | .507 | 1.328 | 1.2725 |

*Each diameter average of four.

I claim:

1. A process for the preparation of shaped articles having a tensile strength of at least about 14,800 psi from coalescible and densifiable powder of poly(methaphenylene isophthalamide) by heating the powder in a mold of the desired configuration to a temperature of about from 265° to 320° C. while simultaneously maintaining the powder under a pressure of about from 100 to 2500 psi.

2. A process of claim 1 wherein the temperature is about from 285° to 295° C.

3. A process of claim 1 wherein the pressure is about from 200 to 1500 psi.

4. A process of claim 1 wherein the poly(metaphenylene isophthalamide) powder comprises about from 1 to 75 percent by weight, based on the total weight of the composition, of a particulate additive.

5. A process of claim 4 wherein the additive is incorporated by having been present during the precipitation of the poly(metaphenylene isophthalamide).

6. A process of claim 4 wherein the particulate additive comprises about from 16 to 60 percent by weight of the composition.

7. A process of claim 1 wherein the poly(metaphenylene isophthalamide) is previously formed to about the desired configuration.

* * * * *